Sept. 29, 1925.

G. W. BULLEY

MOLD

Filed Nov. 22, 1924

1,554,986

Inventor:
George W. Bulley,
by *Spear Middleton Donaldson & Hall*
Attys.

Patented Sept. 29, 1925.

1,554,986

UNITED STATES PATENT OFFICE.

GEORGE W. BULLEY, OF AKRON, OHIO, ASSIGNOR TO THE MILLER RUBBER COMPANY, OF AKRON, OHIO, A CORPORATION OF OHIO.

MOLD.

Application filed November 22, 1924. Serial No. 751,695.

*To all whom it may concern:*

Be it known that I, GEORGE W. BULLEY, a citizen of the United States, and resident of Akron, in the county of Summit and State of Ohio, have invented certain new and useful Improvements in Molds, of which the following is a specification.

The said invention relates particularly to molds such as are used for producing vulcanized rubber articles. These have generally been made of cast iron or steel having the mold cavity or cavities machined to give the proper smoothness, but where the cavity is of irregular contour or intricate design, this becomes an exceedingly difficult and expensive operation.

For such designs molds cast of a relatively soft metal have been used, but such molds have not been satisfactory, as in the ordinary course of factory usage the soft metal is apt to be damaged, particularly at the edge or edges of the mold cavity, and under the heat and pressure of the molding operation there is a tendency of the soft metal to flow and produce a ridge or protuberance at the cavity edge with corresponding inequalities in the article.

The present invention aims to produce a mold which may be economically and easily manufactured and which will be durable in use, and to this end it comprises the novel construction hereinafter described and defined by the appended claims.

A two-part mold embodying my invention is shown in the accompanying drawing, in which:—

Figure 1:
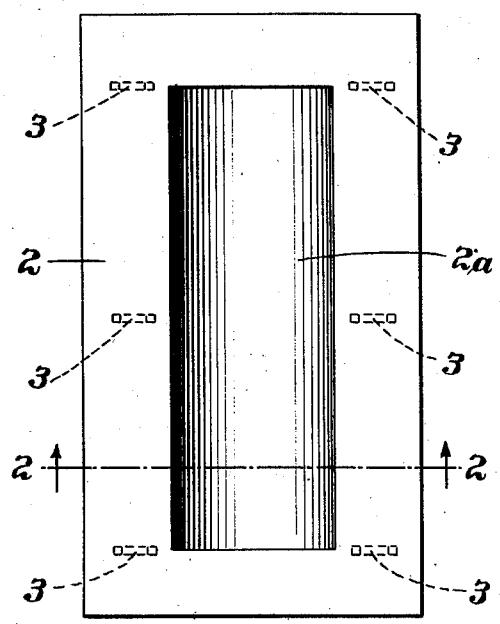
Figure 1 is a plan view of one of the mold members.
Figure 2:
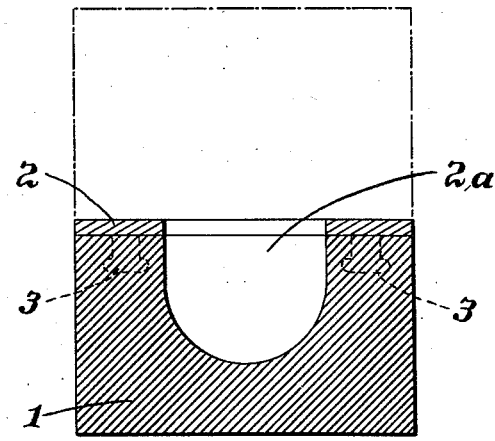
Fig. 2 is a transverse view through one of them, on line 2—2 of Fig. 1.

The mold shown is a two-part mold, each of the members of which comprises a main body portion 1 of relatively soft metal and a facing plate 2 of hard metal such as steel, the exposed faces of the two steel plates forming the parting line of the mold when the members are brought together. Each of the sections or members is shown as having a semi-cylindrical cavity designed to produce, when the members are brought together to enclose the rubber compound, a cylindrical mold chamber, but it will be understood that this is merely representative of any desired shape.

It will also be understood that the mold members may be provided with the usual dowel pins and openings for ensuring alignment of the members, but these are not shown herein, as forming no part of the invention.

It will also be understood that means may be provided for clamping the sections together, these not being necessary in the mold shown, which is intended for press curing.

It will be observed that the hard metal or steel plate completely covers the parting face of each section and its inner edge coincides with and defines the edge of the mold cavity which, being of hard metal, prevents distortion of, or injury to the edge, as aforesaid.

A convenient manner of making each mold section is to provide a steel plate 2 of the desired size and shape having an opening of the proper outline cut therein, which plate would be placed upon a support bearing a matrix of a shape of one-half of the mold cavity, the matrix projecting through the opening. Thereafter the soft metal mold body 1 would be cast about the matrix and upon the facing plate by the use of the usual molders' flask.

Preferably the steel plate would be provided with knobs or headed projections 3 which would be embedded in the soft metal and lock the two parts firmly together.

Having thus described my invention, what I claim is:—

1. A mold member having a body of relatively soft metal, and a facing plate of hard metal, said member having a mold cavity the edge of which is formed by the edge of the hard metal facing plate.

2. A mold member comprising a relatively hard metal plate having an opening therein, and a body portion of relatively soft metal permanently united to said plate and having a cavity, the edge of which is flush with the edge of the opening in said plate.

3. A mold member comprising a body of relatively soft metal having a mold cavity, and a hard metal facing plate completely covering the face of the member about said cavity, said facing plate having projections which are embedded in the soft metal body.

4. A two-part mold for vulcanizing rubber articles, comprising a pair of complementary members having cooperating mold cavities, each member comprising a body of relatively soft metal with a mold cavity therein, and a hard metal facing plate completely covering the soft metal body and defining the parting line of the mold, the said facing plate having an opening conforming to the cavity in shape, the edge of said opening defining the mouth of the mold cavity at the parting line.

In testimony whereof, I affix my signature.

GEORGE W. BULLEY.